Figure 1:
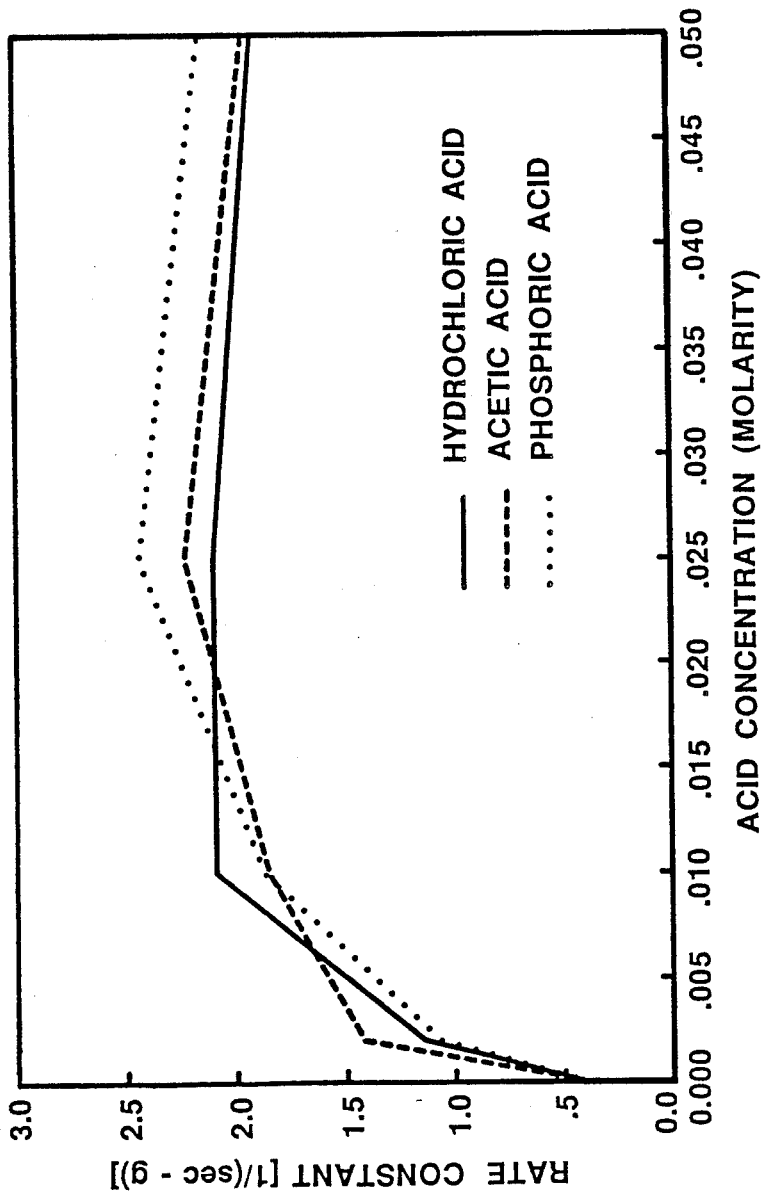

United States Patent [19]

Dosch et al.

[11] Patent Number: 4,929,582
[45] Date of Patent: * May 29, 1990

[54] HYDROUS OXIDE ION-EXCHANGE COMPOUND CATALYSTS

[75] Inventors: Robert G. Dosch; Howard P. Stephens, both of Albuquerque, N. Mex.

[73] Assignee: The United States of American as Represented by The United States Department of Energy, Washington, D.C.

[*] Notice: The portion of the term of this patent subsequent to Apr. 29, 2005 has been disclaimed.

[21] Appl. No.: 849,913

[22] Filed: Apr. 9, 1986

[51] Int. Cl.$^5$ .......................... B01J 21/06; B01J 23/20
[52] U.S. Cl. .......................................... 502/11; 502/12
[58] Field of Search .......................... 502/11, 12, 339

[56] References Cited

U.S. PATENT DOCUMENTS 3,573,228  3/1971  Holmes et al. .......................... 502/11
4,511,455  4/1985  Dosch et al. .................... 502/308 X

*Primary Examiner*—W. J. Shine
*Attorney, Agent, or Firm*—Armand McMillan; Albert Sopp; Judson R. Hightower

[57] ABSTRACT

A catalytic material of improved activity which comprises a hydrous, alkali metal or alkaline earth metal or quaternary ammonium titanate, zirconate, niobate, or tantalate, in which the metal or ammonium cations have been exchange with a catalytically effective quantity of a catalyst metal, and which has been subsequently treated with a solution of a Bronsted acid.

5 Claims, 1 Drawing Sheet

HYDROUS OXIDE ION-EXCHANGE COMPOUND CATALYSTS

The U.S. Government has rights in this invention pursuant to Contact No. DE-AC04-76DP00789 between the U.S. Department of Energy and AT&T Technologies, Inc.

BACKGROUND OF THE INVENTION

This invention relates to improved hydrogenation and other processes using an improved catalyst system.

Many metallic catalysts, usually adsorbed on inert supports, are currently available to the chemical industry for use in a large number of chemical transformations. Included among these are various metals supported on titanates, e.g., zinc titanate. A recent development in this art involves certain compositions which comprise an active metal on a carrier, said metal being active in catalyzing a given chemical process. These particular compositions consist of hydrous alkali or alkaline earth metal titanates, zirconates, niobates, or tantalates, in which some or all or the alkali or alkaline earth metal has been replaced by an ion-exchange process with a catalytically effective quantity of active metal, such as nickel, palladium, molybdenum, and the like. (U.S. Pat. No. 4,511,455, issued to R. G. Dosch, et al). The preparation of these catalysts has been thoroughly described in the following literature articles which, along with U.S. Pat. No. 4,511,455, are incorporated by reference in this application: R. G. Dosch, "The use of Titanates in Decontamination of Defense Waste", SAND-78-0710, Sandia National Laboratories, Albuquerque, N. Mex. (Jun. 1978); R. G. Dosch, "Final Report on the Application of Titanates, Niobates, and Tantalates to Neutralized Defense Waste Decontamination—Materials Properties, Physical Forms, and Regeneration Techniques", SAND-80-1212, Sandia National Laboratories, Albuquerque, N. Mex. (Jan. 1981); H. P. Stephens et al, "Hydrous Metal Oxide Ion Exchangers for Preparation of Catalysts for Direct Coal Liquefaction", I&EC Product Research & Devel., Vol. 24, 15-19 (Mar. 1985).

With respect to supports or substrates, Dosch et al recognize, in their patent disclosure, that "if necessary, the acidity or basicity of the substrate can be modified by conventional ion exchange." (col. 2, 1. 59-61). This statement summarized at the time their view of that art, a view which did not encompass any notion of what the effect of such modifications might be, if any, on chemical processes such as hydrogenation. Moreover, applicants are not aware of any publication in the literature which connects heterogeneous catalyst acidity with hydrogenation activity.

SUMMARY OF THE INVENTION

It is now an object of this invention to greatly enhance the activity of catalysts prepared from hydrous metal oxide ion exchangers in order to decrease the requirements for noble metals, the cost of which generally determines the cost of a catalyst.

Additional objects, advantages, and novel features of the invention will be set forth in part in the description which follows, and in part will become apparent to those skilled in the art upon examination of the following disclosure, or may be learned by practice of the invention. The objects and advantages of the invention may be realized and attained by means of the instrumentalities and combinations particularly pointed out in the appended claims.

These objects have been attained by contacting catalysts made from the hydrous metal oxide ion exchanger compounds of the art with a dilute aqueous solution of a Bronsted acid, separating and drying the treated solids.

The hydrous metal oxide ion exchange compounds are inorganic materials that can be represented by the formula $M(M'_xO_yH_z)_n$, in which M is an exchangeable cationic species such as an alkali metal, an alkaline earth metal, or a quaternary ammonium cation and M' is Ti, Nb, Zr, or Ta. Catalysts are prepared from these compounds by exchanging their cations for active metal cations, e.g., Pd, in quantities sufficient to provide catalytically useful materials. These catalytic material can be prepared in bulk form, as disclosed in U.S. Pat. No. 4,511,455 (discussed earlier), or as thin coatings on inert supports, as disclosed in co-pending patent application Ser. No. 849,626, filed on Apr. 9, 1984, 1986, by Robert G. Dosch and Howard P. Stephens, for "Preparation of Catalysts via Ion-Exchangeable Coatings on Supports".

DRIEF DESCRIPTION OF THE DRAWING

FIG. 1 illustrates the effect of acid on the catalytic activity of hydrous oxide ion exchange compound catalysts in hydrogenation reactions.

DETAILED DISCUSSION

The preparation of some of the catalysts that can be improved by the process of this invention involves three steps, as described in U.S. Pat. No. 4,511,455. A typical preparation, Preparation A, is empirically illustrated below:

(1) Reaction of tetraisopropyl titanate with sodium or potassium hydroxide in alcohol solution:

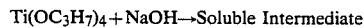
$$Ti(OC_3H_7)_4 + NaOH \rightarrow \text{Soluble Intermediate}$$

(2) Hydrolysis of the soluble intermediate in acetone/water mixture to form the hydrous metal oxide ion exchange material:

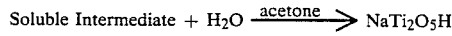
$$\text{Soluble Intermediate} + H_2O \xrightarrow{\text{acetone}} NaTi_2O_5H$$

(3) Ion exchange of the alkali or alkaline earth metal or quaternary ammonium for active metal ions (e.g., $Pd^{++}$) in aqueous solution to form the catalyst:

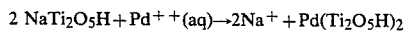
$$2\ NaTi_2O_5H + Pd^{++}(aq) \rightarrow 2Na^+ + Pd(Ti_2O_5H)_2$$

Along with the bulk hydrous metal oxide ion-exchanged materials of U.S. Pat. No. 4,511,455, thin film hydrous metal oxide ion-exchanged catalysts, such as disclosed in co-pending patent application Ser. No. 849,626, can also benefit from the process of the present invention. The preparation, Preparation B, of these materials can be illustrated as follows:

(1) Synthesizing a soluble hydrous metal ion exchange compound, for instance:

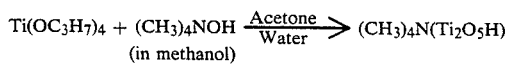
$$Ti(OC_3H_7)_4 + (CH_3)_4NOH \xrightarrow[\text{(in methanol)}]{\text{Acetone / Water}} (CH_3)_4N(Ti_2O_5H)$$

(2) Depositing the ion exchange compound as a coating on an inert support by contacting an aqueous solution of, for example, the tetramethylammonium hydrous titanium oxide prepared in step (1) above, and drying the thus wetted support; and (3) Ion exchaning the tetramethylammonium of the support coating for those of a catalytically active metal in aqueous solution, for instance:

$$2 \ (CH_3)_4N(Ti_2O_5H) + Pd^{++}(aq) \rightarrow 2 \ (CH_3)_4N^+(aq) + Pd(Ti_2O_5H)_2$$

Upon experimenting with post-preparation treatment of such catalysts as have just been described, it was discoved that contacting the catalysts with dilute aqueous acid solutions dramatically enhanced their hydrogenation activity. This is a rather simple but surprisingly effective process. The catalytic material is wetted with the acid solution and dried by suitable conventional means. The acids that can be used are the Bronsted type of compound, preferably common mineral acids such as hydrochloric acid, sulfuric acid, phosphoric acid, and nitric acid, as well as acetic acid, and the like. Preferred concentrations will vary from very dilute solutions of acids, e.g., about 0.001M, to about 0.25M.

As already mentioned, usable hydrous metal ion exchange compounds are inorganic materials represented by the empirical formula $M(M_x'O_yH_3)_n$, in which M is an exchangeable cation and M' is a cation of titanium, niobium, zirconium, or tantalum. As intimated earlier both these exchange compounds and the catalysts derived form them can be prepared by methods disclosed in U.S. Pat. No. 4,511,455 and in co-pending application Ser. No. 849,626, both documents being incorporated by reference herein. Specific embodiments of the present invention will now be described. They are to be construed as illustrative, not limiting in any manner the scope of the invention as expressed by the appended claims.

EXAMPLE 1

In this series of experiments, 2.0 g portions of a palladium hydrous titanate, prepared according to Procedure A above and Example 2 of U.S. Pat. No. 4,511,455, were contacted with 100 ml portions of three different acids—hydrochloric, phosphoric, and acetic acids, at four different concentrations each, namely 0.002, 0.010, 0.025, and 0.050 molar, for a period of about 10 minutes to about 2 hours. The catalytic materials were separated from the solution by filtration and dried under vacuum at ambient temperature.

These acidified catalysts were then tested for liquid phase pyrene (10% pyrene in n-hexadecane) hydrogenation activity at 100° C. and 100 psig.

Because the rate of hydrogenation of pyrene (Py) to 4,5-dihydropyrene ($H_2Py$) can be described by irreversible pseudo-first order kinetics at low temperatures, the palladium weight basis rate constant k—a quantitative measure of catalytic activity for pyrene hydrogenation, $$H_2 + Py \rightarrow H_2Py$$

can be calculated as follows:

$$k = \frac{-\ln \frac{[Py]_t}{[Py]_o}}{W_{pd}t} \ sec^{-1}g^{-1}$$

where $[Py]_o$ is the initial pyrene concentration, $[Py]_t$ is the concentration after reaction time t (sec), and $W_{Pd}$ is the weight of palladium loaded into the reactor. The rate constant k is thus a quantitative measure of the pyrene hydrogenation activity of the catalyst.

The results of activity testing of the treated catalysts of this example are shown in FIG. 1, a plot of pyrene hydrogenation rate constant against the concentration of the acid solution used.

As can be seen in FIG. 1, the rate constants increase from 0.34 $sec^{-1} g^{-1}$ for the non-acidified catalyst to values ranging from 2.1 to 2.4 at an acid concentration of 0.025 molar. Thus, catalytic activity can be enhanced by nearly an order of magnitude by contacting the catalyst with acid. For comparison, a commercially available palladium catalyst (not a hydrous metal oxide type) had a pyrene hydrogenation rate constant of 0.09 $sec^{-1} g^{-1}$.

EXAMPLE 2

In this series of experiments, palladium catalysts were prepared according to Procedure B above, by coating a thin film of hydrous titanate on controlled pore size glasses of three different pore sizes, namely 70, 167, and 324 angstroms. These catalysts were contacted with 0.020 and 0.1 molar sulfuric acid and phosphoric acid solutions. Results of evaluation of pyrene hydrogenation activity of these acid-treated thin-film catalysts are given in the following table.

As can be seen in Table 1, post-preparation treatment of the palladium hydrous titanate coated controlld pore glass catalysts with dilute sulfuric or phosphoric acid solutions increases their activity by a factor of 2 or 3.

TABLE 1

| Hydrogenation Activity of Acid-treated Controlled Pore Glass Catalysts Palladium Weight Basis Rate Constants ($sec^{-1} g^{-1}$) | | | | | |
|---|---|---|---|---|---|
| Pore | $H_2SO_4$ | | $H_3PO_4$ | | |
| Diameter, A | 0.02 M | 0.1 M | 0.0–2 M | 0.1 M | No Acid |
| 70 | 1.10 | 0.72 | 1.00 | 0.97 | 0.61 |
| 167 | 1.01 | 0.90 | 1.10 | 0.95 | 0.55 |
| 324 | 1.37 | 1.41 | 1.14 | 1.19 | 0.40 |

EXAMPLE 3

Additional measurements with a variety of hydrous metal oxide ion-exchanger catalysts have been performed to demostrate further the augmentation of catalytic activity following acidification. The catalysts were prepared according to Procedures A and B, as the case may be, and were acidified with 0.21M hydrochloric acid, as described earlier. Activity comparisons are made using rate constants for the hydrogenation of pyrene at 100° C. and 100 psig. The results of these measurements are listed in Table 2.

TABLE 2

| Comparison of Hydrogenation Activity Acid-treated Hydrous Oxide Catalysts | | |
|---|---|---|
| | k, $sec^{-1} g^{-1}Pd$ | |
| | As prepared | Acidified |
| Hydrous Metal Oxide Powders | | |
| Pd exchanged Ca-hydrous titanate: | 1.26 | 2.53 |
| Pd exchanged Na-hydrous zirconate: | 0.25 | 0.36 |
| Pd exchanged Na-hydrous niobate: | 0.47 | 1.47 |
| Supports Coated with Hydrous Titanates | | |

TABLE 2-continued

Comparison of Hydrogenation Activity
Acid-treated Hydrous Oxide Catalysts

| | k, sec$^{-1}$ g$^{-1}$Pd | |
|---|---|---|
| | As prepared | Acidified |
| -alumina, high activity, 30–40 mesh, quaternary ammonium hydrous titanate coating, Pd exchanged: | 0.07 | 0.52 |
| -alumina, 30–40 mesh, coated with Na-hydrous titanate, Pd exchanged: | 0.04 | 0.201 |
| Carbonized resin spheres (Ambersorb XE-340), quaternary ammonium hydrous titanate coating, Pd exchanged: | 0.06 | 0.22 |

EXAMPLE 4

A molybdenum exchanged hydrous titanate catalyst was prepared according to Procedure A above and Example 2 of U.S. Pat. No. 4,511,455. Some of this catalyst was acidified with 0.025 molar hydrochloric acid and dried as earlier described.

The catalystic activity of both the acidified and non-acidified preparation was determined by use in pyrene hydrogenation at 300° C. and 500 psig. The catalysts were activated conventionally by "in situ" sulfidation with a mixture of 10 mole % H$_2$S in H$_2$.

The higher pressure and temperature were used because of the lower intrinsic activity of molybdenum in this type of reaction. At this higher temperature, the hydrogenation of pyrene is reversible and the rate constant reported is the sum of the forward and reverse rate constants for the reaction Pyrene+H$_2$⇌4,5-dihydropyrene and is calculated as follows:

$$k = \frac{\ln \frac{X_e}{X_e - X_t}}{W_m t}$$

where $X_t$ and $X_e$ are the extent of reaction at time t and at equilibrium and $W_m$ is the weight of molybdenum. For pyrene, $$X_t = \frac{[H_2P_y]_t}{[P_y]_t + [H_2P_y]_t} \text{ and } X_e = \frac{PK_p}{1 + PK_p}$$

where P is pressure and K$_p$ is the pressure equilibrium constant.

The results obtained were:
Catalyst as prepared: K=0.44 sec$^{-1}$ g$^{-1}$Mo
Acidified catalyst: k=0.86

Again can be seen the beneficial effect of acidification of hydrous metal oxide catalysts. It should be noted at this point that in addition to increasing the activity of hydrous titanate type supported catalysts, contact with acids also alters their compositions.

In conclusion, whatever the reason for the improvements disclosed herein, it remains clear that, from the foregoing description, one skilled in the art can easily ascertain the essential characteristics of this invention, and, without departing from the spirit and scope thereof, can make various modifications of said invention to adapt it to various usage and conditions.

What is claimed is:

1. A catalytic material comprising a hydrous, alkali metal, alkaline earth metal, or quaternary ammonium titanate, zirconate, niobate, or tantalate, in which the metal or quaternary ammonium cations have been exchanged with a catalytically effective quantity of catalytically active metal cations, and which has been subsequently treated with a dilute aqueous solution of a Bronsted acid.

2. The material of claim 1, wherein the acid solution has a molarity within the range of about 0.001 to about 0.25.

3. The material of claim 1, where the acid in the solution is a mineral acid or acetic acid.

4. The material of claim 1, wherein the cation-exchanged hydrous titanate, niobate, zirconate, or tantalate is in bulk form.

5. The material of claim 1, wherein the cation-exchanged hydrous titanate, niobate, zirconate, or tantalate is in the form of a thin film coated on an inert support.

* * * * *